(12) United States Patent
Paul

(10) Patent No.: US 8,562,332 B2
(45) Date of Patent: Oct. 22, 2013

(54) DEVICE FOR MANUFACTURING FEEDSTUFF MOLDED INTO SHELLS

(75) Inventor: Michael Paul, Bergneustadt (DE)

(73) Assignee: Buhler AG, Uzwill (CH)

( * ) Notice: Subject to any disclaimer, the term of this patent is extended or adjusted under 35 U.S.C. 154(b) by 603 days.

(21) Appl. No.: 11/887,719

(22) PCT Filed: Jan. 13, 2006

(86) PCT No.: PCT/CH2006/000032
§ 371 (c)(1),
(2), (4) Date: Oct. 1, 2007

(87) PCT Pub. No.: WO2006/102773
PCT Pub. Date: Oct. 5, 2006

(65) Prior Publication Data
US 2009/0017150 A1    Jan. 15, 2009

(30) Foreign Application Priority Data

Mar. 31, 2005   (CH) .......................... 10 2005 015 052

(51) Int. Cl.
*A23G 1/21* (2006.01)
(52) U.S. Cl.
USPC ........... 425/407; 425/507; 425/509; 426/512; 426/515; 249/135
(58) Field of Classification Search
USPC .......... 426/512, 515, 524; 425/407, 507, 509; 249/135
See application file for complete search history.

(56) References Cited

U.S. PATENT DOCUMENTS

| 4,273,793 | A  | * | 6/1981 | Fariel et al. | 426/512 |
| 6,268,006 | B1 | * | 7/2001 | Knobel | 426/515 |
| 6,843,168 | B2 | * | 1/2005 | Refer | 425/416 |

FOREIGN PATENT DOCUMENTS

| DE | 966073 | 7/1957 |
| EP | 0925720 | 6/1999 |
| EP | 130086 | 4/2003 |
| EP | 1346642 | 9/2003 |

* cited by examiner

*Primary Examiner* — Richard Crispino
*Assistant Examiner* — Thukhanh Nguyen
(74) *Attorney, Agent, or Firm* — Wolff & Samson, PC

(57) ABSTRACT

The invention relates to a device for producing goods for consumption, consisting of a fat mass, in particular a fat mass containing cocoa or a chocolate-type fat mass, said goods contains a large number of hollow moulds (1a, 1b) that can be filled with the fat mass (M) when the latter has been heated and is in a free-flowing state, the moulds being configured as depressions in a mould block (1). The inner surface of each hollow mould (1a, 1b) shell-shaped goods for consumption that are to be produced. The device also comprises a plurality of die-type cooling bodies (3a, 3b), which are displaceably mounted on a suspension device (4), a respective cooling body (3a, 3b) being lowered into a respective hollow mould (1a or 1b) and the outer surface of the respective cooling body (3a, 3b) determining the inner surface of the shell-shaped goods for consumption (M) that are to be produced. According to the invention, the plurality of cooling bodies (3a, 3b) that is mounted on the suspension device (4) consists of individual cooling body groups (3), in which several cooling bodies (3a, 3b) are coupled together and mounted on the suspension device (4). The individual cooling body groups (3) are mounted independently of one another on the suspension device (4).

13 Claims, 5 Drawing Sheets

DEVICE FOR MANUFACTURING FEEDSTUFF MOLDED INTO SHELLS

This is a U.S. national stage of application Ser. No. PCT/CH2006/00032, filed on Jan. 13, 2006. Priority is claimed on that application and on the following application:
Country: Germany, Application No.: 10 2005 015 052.7
Filed: Mar. 31, 2005.

BACKGROUND OF THE INVENTION

The invention relates to a device for manufacturing feedstuff molded into shells out of a fatty substance, in particular a cocoa-containing or chocolate-like fatty substance. Chocolate shells fabricated in this way are used, for example, in the manufacture of pralines.

Such a device contains a plurality of molds that can be filled with the fatty substance in a liquid, temperature-controlled state, which are designed as depressions in a mold block. The interior surface of a respective mold here determines the exterior surface of a shell-like feedstuff to be manufactured. In addition, the device contains a plurality of stamp-like cooling bodies, which can move along a mounting device, wherein a respective cooling body can be lowered into a respective mold. The exterior surface of a respective cooling body here determines the interior surface of the shell-like feedstuff to be manufactured.

Feedstuff molded into shells can be fabricated with this device.

At the beginning of the process, melted fatty substance is metered into the molds of a mold block or mold plate, so that the latter are partially filled with the melted mass. As a rule, the partially filled molds are briefly vibrated to expel any gas pockets and/or distribute the melted mass. The mounting device with cooling bodies attached thereto is then lowered against the mold block or mold plate, wherein the stamp-like cooling bodies penetrate into the molds partially filled with the melted mass and displace the melted mass, which then becomes distributed in the respective cavity between the exterior surface of a cooling body and the interior surface of a mold. The mounting device with the stamp-like cooling bodies then remains in this lowered position for a short retention time, until the mass distributed in the respective cavities has solidified. The mounting device is subsequently lifted again, and the completely molded shell-like feedstuff consisting of the solidified mass can be removed from the molds. This process is also referred to as "cold stamping".

A plastic plate is generally used as the mold block or mold plate with molds or alveoli. The cooling bodies on the mounting device generally consist of a metal with the best heat-conducting capacity, e.g., aluminum or copper. Over time, the mold plates might experience deformation and wear. Since they are relatively thin, the mold plates tend to bend and bulge, so that they are not quite flat anymore when placed on a mold table. In order to seal the respective cavity between a cooling body exterior surface and a mold interior surface as well as possible, sealing means allocated to the respective cooling bodies must be pressed against the mold plate from above during each cold stamping process.

In time, this deformation and wear of the mold plate cause several of the cooling body/mold pairs to lose the 100% seal between the mold plate and sealing means.

To address this problem, for example, EP 0 945 069 A1 or EP 0 925 720 A1 proposed that all cooling bodies be independently suspended on the mounting device. While this does improve the seal of each mold, it also necessitates a high number of individual parts on the mounting device, and hence involves a higher cost outlay. This is because a sliding bearing is required between the mounting device and each of the cooling bodies independently suspended from it to enable a relative movement between the mounting device and the respective cooling bodies.

EP 1 300 086 A1 proposes that the stamp or cooling body be used to smooth out irregularities on the mold plate. However, it does not refer to any independent suspension of stamps or cooling bodies on a mounting device; rather, the mounting device and cooling bodies with sealing means together form a rigid unit. Relatively high forces are necessary to press a warped mold plate into a flat state.

SUMMARY OF THE INVENTION

The object of the invention is to provide a device of the kind mentioned at the outset that enables a virtually 100% seal between the mold plate and sealing means in all cooling body/mold pairs, even after the device has been in operation for a long period of time.

The device according to the invention has the following:
A plurality of molds that can be filled with the fatty substance in a flowing, temperature-controlled state, which are designed as depressions in a mold block, wherein the interior surface of a respective mold determines the exterior surface of a shell-like feedstuff to be manufactured;
A plurality of stamp-like cooling bodies, which can move along a mounting device, wherein every cooling body can be lowered into a respective mold, and the exterior surface of a respective cooling body determines the interior surface of the shell-like feedstuff to be manufactured.

According to the invention, the plurality of cooling bodies arranged on the mounting device is comprised of individual cooling body groups, within which several cooling bodies are coupled together and secured to the mounting device, while the respective cooling body groups are independently mounted on the mounting device.

It was surprisingly demonstrated that this grouped mounting of cooling bodies with cooling bodies mounted independently during cold stamping yields a very good seal for the respective cavity between a cooling body exterior surface and a mold interior surface for all cooling body/mold pairs. First and foremost, however, this makes it possible to offset differences in metering quantity between various cooling body groups. As a result, different metering volumes and/or different volumes to be filled between the respective cooling bodies (stamps) and molds (alveoli) can be compensated. This enables a smooth processing of various metering volumes.

Therefore, various filling volumes/metering volumes can be compensated using the device according to the invention within an acceptable outlay.

The cooling body groups best consist of cooling body blocks consisting of adjacent cooling bodies. In particular, the respective cooling body groups consist of groups of twos exhibiting two cooling bodies, groups of three exhibiting three cooling bodies, or groups of four exhibiting four cooling bodies. These cooling body blocks are preferably spring-mounted to the mounting device.

The cooling bodies are preferably rigidly interconnected inside a cooling body group. In a particularly preferred embodiment, the cooling body group is a one-piece structure exhibiting several stamp-like cooling bodies. This cooling body group can be interspersed by a shared system of cooling lines.

In another preferred embodiment, the cooling bodies within a cooling body group are coupled together by way of a coupling fluid, wherein the coupling fluid can be an incompressible fluid or a compressible fluid. The fluid can stem from any fluid source desired. For example, air from a compressor or water from a hydraulic pump is possible.

In this case, it is particularly advantageous for a valve to be situated in a fluid supply line that links the fluid source and the cooling body group. This valve can be closed as the mounting device and cooling body groups mounted thereto are lowered. This ensures that the several cooling bodies will be effectively coupled inside and not outside the cooling body groups.

BRIEF DESCRIPTION OF THE DRAWINGS

The invention will be described in the following specification based on a diagrammatic view of the principle according to the invention, and based on exemplary embodiments, which are not to be construed as limiting. Shown on.

DETAILED DESCRIPTION OF THE INVENTION

Figure 1:
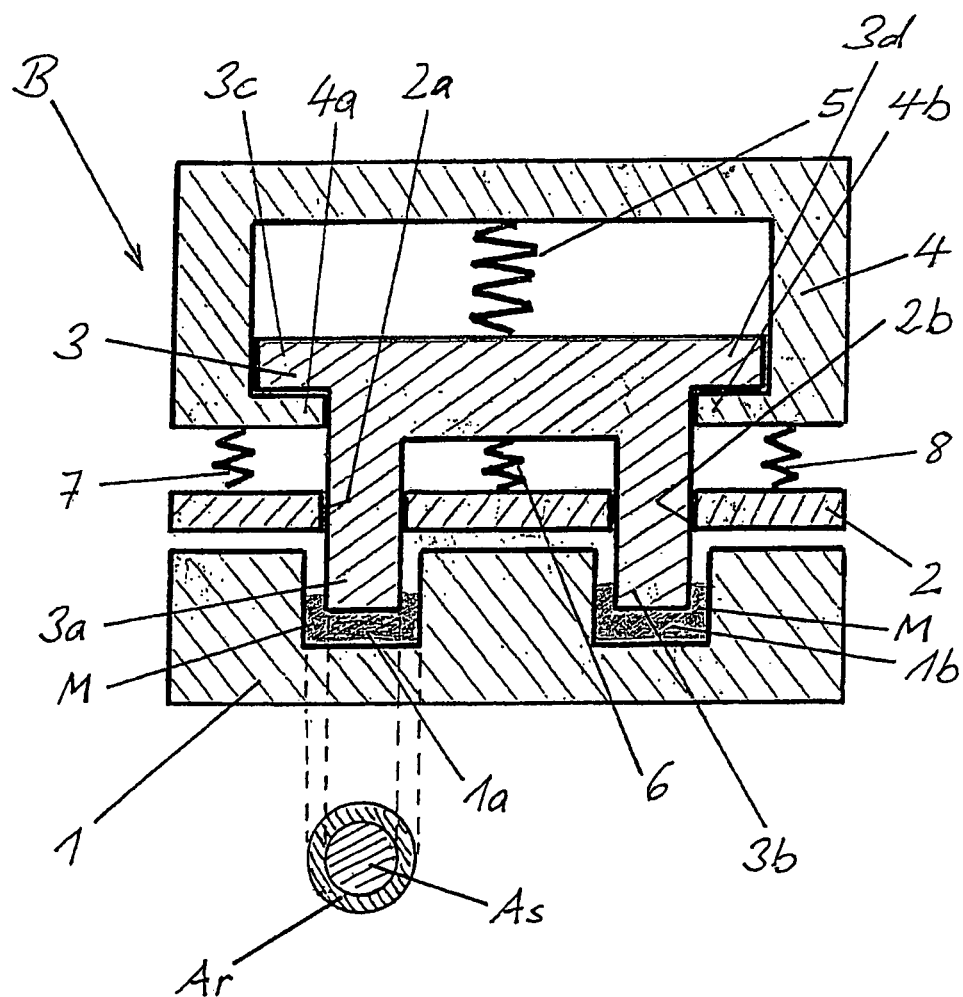
FIG. 1 is a side view of a diagrammatic depiction of the device according to the invention.

FIG. 1 provides a diagrammatic view of the essential parts of the device according to the invention in a vertical section. Situated at the very bottom is a mold block 1 with two molds or alveoli 1a and 1b. Located above that is a block unit B having the following three elements: A sealing plate 2, a stamping block 3 and a mounting device 4.

The sealing plate 2 contains a first passage 2a and a second passage 2b, through which a first cooling body 3a and a second cooling body 3b of the stamping block 3 project. FIG. 1 does not show the cooling agent flowing over the stamping block 3 or in the cooling bodies 3a, 3b along with the cooling agent lines arranged in the cooling bodies. The cross section As of the cooling bodies 3a and 3b is identical to the cross section of the passages 2a and 2b of the sealing plate 2. The stamping block 3 also has a left shoulder 3c and a right shoulder 3d. The mounting device 4 has a left shoulder 4a and a right shoulder 4b, which serve as a stop for the left shoulder 3c or for the right shoulder 3d of the stamping block 3.

However, the shoulders shown on FIG. 1 can also be designed as desired. It is only important that they be configured in such a way as to be able to hold the stamping block 3. Therefore, shoulders 4a and 4b are stamping block mounting shoulders that help prevent the stamping block 3 from falling out of the mounting device 4.

The block unit B also has the following four spring elements: A first spring 5 between the stamping block 3 and mounting device 4, a second spring 6 between the sealing plate 2 and the stamping block 3, a third spring 7 and a fourth spring 8 between the respective sealing plate 2 and mounting device 4 on the left or right side of the block unit B.

The spring 5 situated in the middle of block unit B cushions the stamping block 3 against the mounting device 4. Spring 6 is also situated in the middle of block unit B, cushioning the sealing plate 2 against the stamping block 3. The springs 7 and 8 situated to the left and right of block unit B cushion the sealing plate 2 against the mounting device 4.

The spring 6 is preferably omitted. In this case, only the springs 5 are present between the stamping block 3 and the mounting device 4, along with the springs 7 and 8, each between the sealing plate 2 and mounting device 4. The spring 5 acts as a compression spring, e.g., a steel spring, as part of a pneumatic or hydraulic system, i.e., it presses the stamping block 3 down against the upwardly directed hydraulic counterpressure (lift) caused the by the fatty substance M. If the hydraulic counterpressure of the mass M is greater than the force of the compression springs 5, the path for the stamping block 3 is compensated.

The sealing plate 2 arranged above the mold block 1 is not suspended independently. However, volume differences between the individually formed feedstuff products, e.g., chocolate shells, which also result from irregularities of the upper surface of the mold block 1, can also be offset indirectly by the sealing plate 2, via the slightly variable paths of the cooling bodies 3a, 3b ("cold stamping paths") for each mold 1a, 1b ("alveolus").

FIG. 1 shows the device according to the invention during a step in the cold stamping process described at the outset.
Step 1 (Metering)

Melted fatty substance M is metered into the molds 1a and 1b of the mold block 1, so that the molds 1a and 1b are partially filled with the melted substance M. The mold block 1 with the partially filled molds 1a and 1b is then briefly vibrated to expel any gas inclusions from the liquid mass M.
Step 2 (Lowering, Pressing)

The block unit B incorporating the stamping block 3 and its cooling bodies 3a and 3b is then lowered toward the mold block 1 via a downwardly directed force acting on the mounting device 4 of the block unit B (this phase is shown on FIG. 1), so that the stamp-like cooling bodies 3a and 3b penetrate into the molds 1a and 1b partially filled with the melted fatty substance M, and displace the melted substance M in such a way as to distribute it in the respective mold between the exterior surface of a cooling body 3a and 3b and the interior surface of a mold 1a or 1b. The springs 6, 7 and 8 are rigid enough to press the sealing plate 2 against the mold block, and then keep the two cavities completely filled with the substance M completely sealed to the top and closed while the stamp 3a and stamp 3b are pressed into the mold 1a and mold 1b against the substance M, giving rise to a pressure p in the substance. The spring 6 can here also be omitted as discussed further above. In this state, an equilibrium then prevails between a force F that acts downwardly on the block unit B via the mounting device 4, and an upward force $2 \times p \times (As+Ar)$ applied to the blocking unit B through the two stamping surfaces As of the stamping block 3 and the two annular surfaces Ar of the sealing plate 2
Step 3 (Pressing, Cooling)

The block unit B is now at equilibrium between the downwardly directed force F and the upwardly directed force, which acts on the block unit B via the liquid mass M, in which pressure p prevails, meaning:

$$F = 2 \times p \times (As + Ar)$$

In this case, As is the effective stamping surface of the cooling bodies 3a and 3b, and Ar is the effective annular surface of the sealing plate 2 that seals the cavity filled with mass M. The cooling bodies 3a and 3b then remain in this lowered position for a short retention period, until the mass M distributed in the respective cavities has solidified.
Step 4 (Lifting, Removal)

The block unit B is subsequently lifted again, and the completely molded, shell-like feedstuff comprised of the hardened mass M can be removed from the molds, e.g., knocked out.

In the state of equilibrium achieved in step 3, the three elements 2, 3, 4 of block unit B reach an equilibrium at which the three elements 2, 3, 4 each are shifted by a vertical distance relative to an initial setting. The initial setting can be the setting in which the sealing plate 2 bumps the mold plate 1 from above, none of the springs 5, 6, 7, 8 are compressed yet, and the still liquid mass M has only been partially distributed in the cavities between the cooling bodies 3a, 3b and the molds 1a, 1b, if at all.

The spring constants k1, k2, k3, k4 of the springs 5 and/or 6, spring 7 and spring 8 are rated in such a way that, when the mounting device 4 is pressed down relative to its initial setting by distance s1, the stamping block 3 can only move down by a distance of s2<s1.

The force F, pressure p, areas As and Ar, spring constants k1, k2, k3, k4 and distances s1 and s2 are correlated by the respective vertical equilibrium of forces on the sealing plate 2, stamping block 3 and mounting device, and can be tailored to each other as required (e.g., requirement s2<s1).

The shoulders 3c, 3d of the stamping block 3 and the shoulders 4a, 4b of the mounting device 4 can also be omitted. The spring 5 can also assume the function of the shoulders by itself. The stamping block 3 "floats" during operation, and is at equilibrium between the force exerted by the springs 5 and/or 6 and the force exerted by the pressure of the mass M.

Figure 2A:
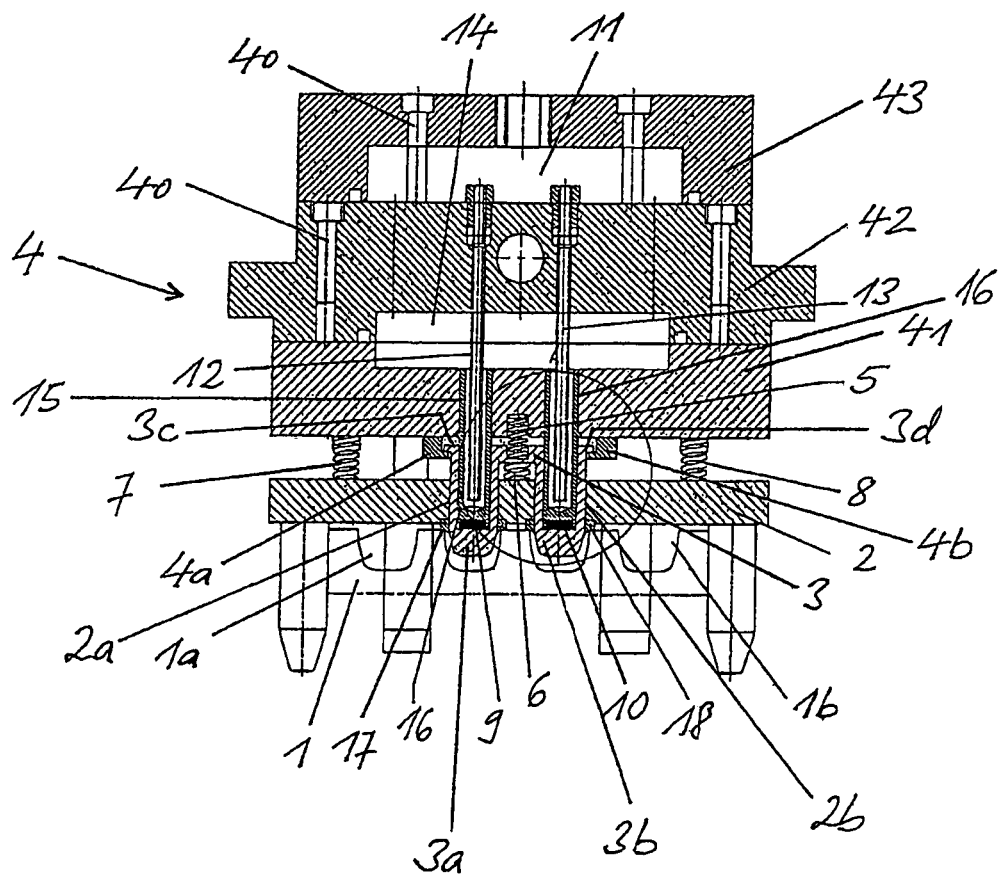
FIG. 2A is a first exemplary embodiment of the device according to the invention along a vertical sectional plane.
Figure 2B:
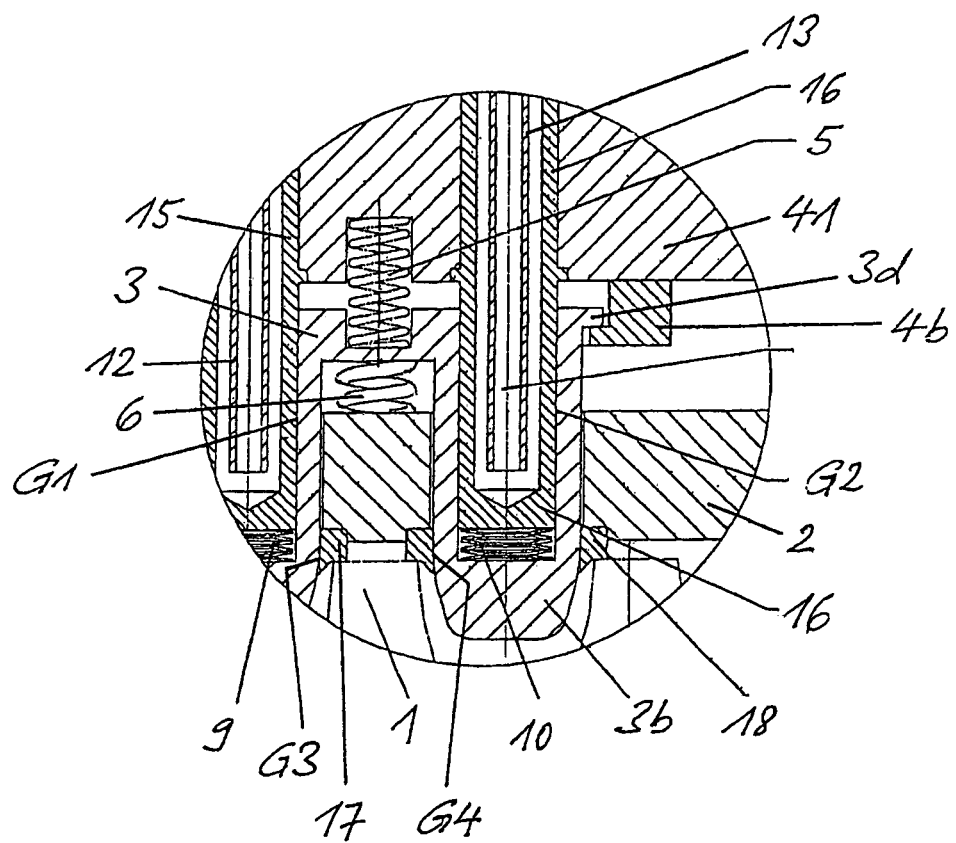
FIG. 2B is a magnified section of FIG. 2A.

FIG. 2A shows a first exemplary embodiment of the device according to the invention along a vertical cutting plane. FIG. 2B shows a magnified section of FIG. 2A. Elements on FIG. 2A and FIG. 2B that correspond to those on FIG. 1 are labeled on FIG. 2A and FIG. 2B with the same reference numbers as in FIG. 1.

The mounting device 4 on FIG. 2A contains a lower plate 41, a middle plate 42 and an upper plate 43, which are bolted together via screwed connections 40. A recess in the upper plate 43 forms a cooling agent flow distribution line 11, from which a flow pipe 12 and a flow pipe 13 branch off, both extending through the middle plate 42 until into the stamping block 3. A recess in the middle plate 42 and a recess in the lower plate 41 similarly form a cooling agent collection and return line 14, into which a return pipe 15 and return pipe 16 empty. The two return pipes 15 and 16 are each designed as a dummy pipe, extend through the lower plate 41, and their dummy end projects out of the lower plate 41 to the back. The flow pipe 12 and the flow pipe 13 extend through the middle plate 42, traverse the cooling agent collection and return line 14, and finally project into the return pipe 15 or into the return pipe 16. This ensures an intensive cooling of both return pipes 15 and 16, since the "cooling source" or heat sink is very close to the location that needs cooling.

The return pipes 15, 16 have a dual function. On the one hand, they cool the cooling bodies (stamp) 3a, 3b of the stamping block 3 that they come into contact with. On the other hand, they serve as sliding bearings, on which the stamping block 3 is movably mounted with its hollow cooling bodies (stamps) 3a, 3b. G1 and G2 on FIG. 2B denote the sliding surface pairs generated by the exterior surfaces of the return pipe 15, 16, and by the interior surfaces of the hollow cooling bodies 3a, 3b.

The stamping block 3 on FIG. 2A and FIG. 2B essentially corresponds to the stamping block 3 already shown diagrammatically on FIG. 1, with a left shoulder 3c and a right shoulder 3d, which form a single piece with the stamping block 3. The shoulders 3c and 3d of the stamping block 3 act in conjunction with the shoulders 4a and 4b of the mounting device 4. The shoulders 4a and 4b are secured to the bottom side of the lower plate 41 by attachment means (not shown).

The two springs 5 and 6 correspond to the springs 5 and 6 on FIG. 1. Another spring 9, 10 is additionally situated between the dummy end of the return pipes 15, 16 serving as the cooling unit and sliding bearing and the floor of the hollow cooling body (stamp) 3a, 3b. The spring 5 can be made up of a helical spring, while the springs 9 and 10 preferably consist of space-saving Belleville spring washers. The three springs 5, 9 and 10 on FIG. 2A each act as a stamping block compression spring. They press the stamping block 3 against the mold block 1. Their combined action corresponds to the action of the single stamping block compression spring 5 shown diagrammatically on FIG. 1.

The sealing plate 2 on FIG. 2A and FIG. 2B also corresponds essentially to the sealing plate 2 already shown diagrammatically on FIG. 1. The three springs 6, 7 and 8 correspond to the springs 6, 7 and 8 on FIG. 1. The three springs 6, 7 and 8 on FIG. 2A also act as sealing plate compression springs. They press the sealing plate 2 against the mold block 1. A sleeve termination molder 17 or 18 is secured by means of attachment means (not shown) at the respective lower end of the passages 2a and 2b of the sealing plate 2. The stamping block is also mounted so that it can slide over the exterior surfaces of its cooling bodies (stamps) 3a and 3b on the interior surfaces of the annular sleeve termination molder 17 and 18. G3 and G4 on FIG. 2B mark the sliding surface pairs formed by the exterior surfaces of the cooling bodies 3a, 3b and the interior surfaces of the annular sleeve termination molders 17 and 18.

The spring 6 can also be omitted in this first exemplary embodiment.

Figure 3A:
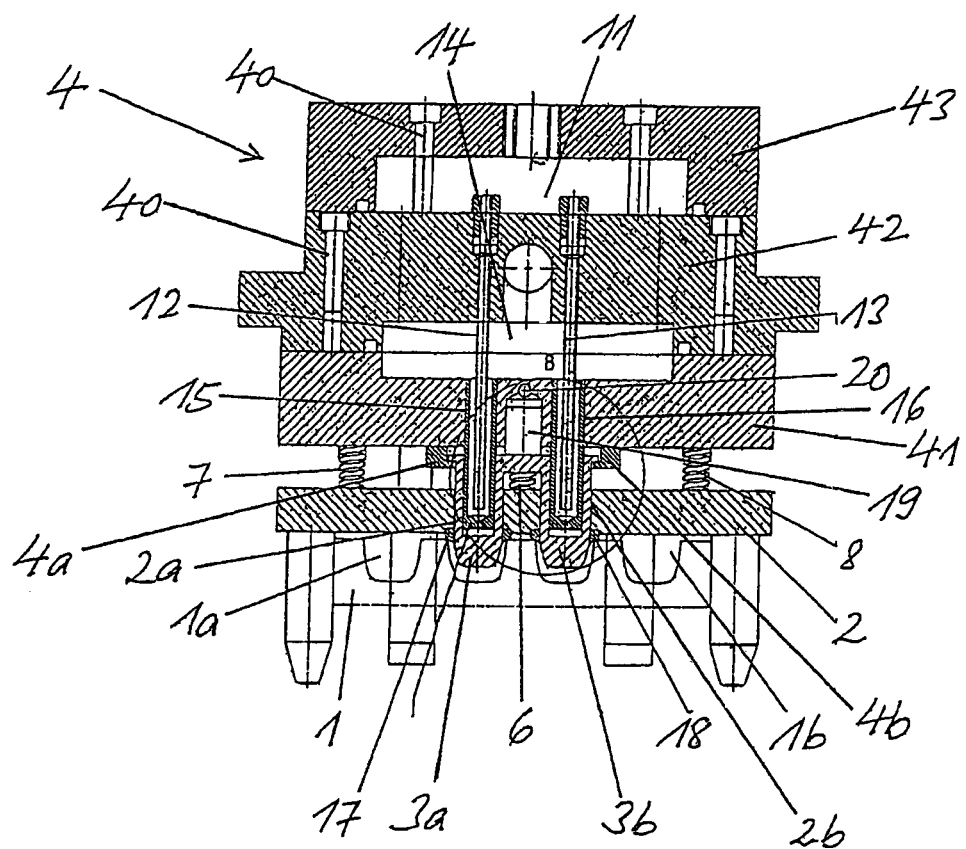
FIG. 3A is a second exemplary embodiment of the device according to the invention along a vertical sectional plane.
Figure 3B:
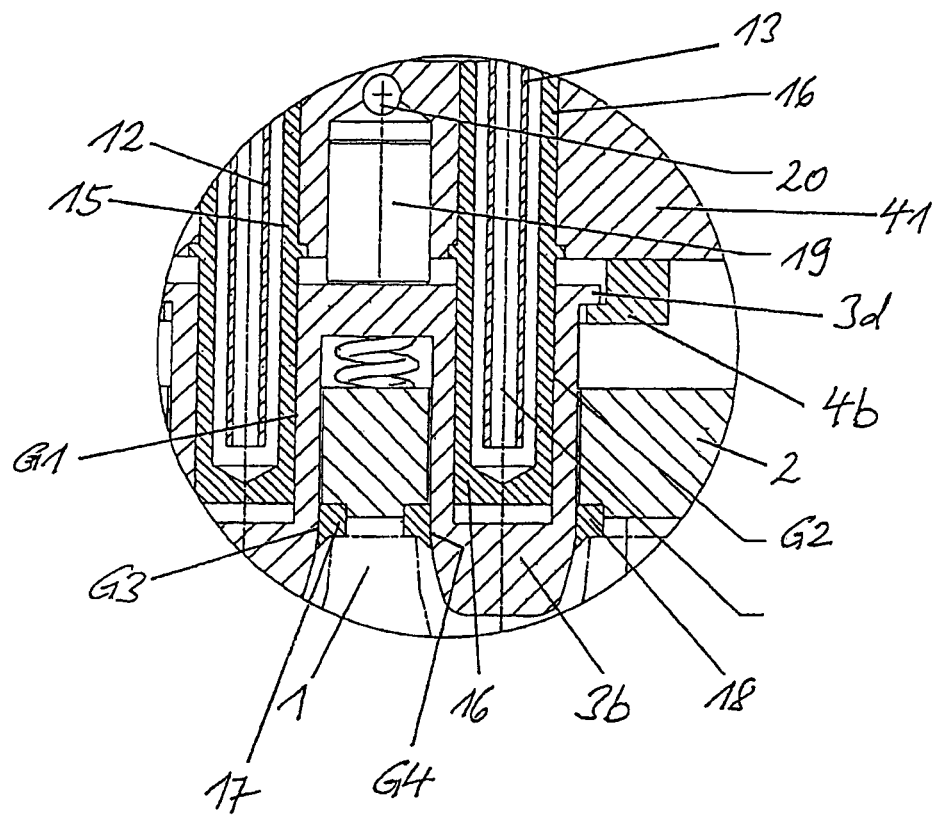
FIG. 3B is a magnified section of FIG. 3A.

FIG. 3A shows a second exemplary embodiment of the device according to the invention along a vertical cutting plane. FIG. 3B shows a magnified section of FIG. 3A. Elements on FIG. 3A and FIG. 3B that correspond to those on FIG. 1 or FIG. 2 are marked with the same reference numbers on FIG. 2A and FIG. 2B as on FIG. 1.

The difference between the first and second exemplary embodiment lies in the fact that the second exemplary embodiment involves a pressure cylinder 19 arranged between the mounting device 4 comprised of the plates 41, 42, 43 and the return pipes 15, 16 and the stamping block 3, which assumes the function of the spring 5 on FIG. 1 or the three springs 5, 9 and 10 on FIG. 2A. The pressure cylinder 19 communicates with a compressed air channel 20, through which compressed air is relayed to the pressure cylinder 19.

The spring can also be omitted in this second exemplary embodiment.

The stamping block 3 forms a single unit comprised of at least two individual stamps or cooling bodies 3a, 3b. Preferred materials include readily heat-conducting metals or metal alloys, such as copper or aluminum, wherein the exterior surface of the cooling stamps 3a, 3b facing the fatty substance is preferably coated with silver. The silver coating has an antiseptic effect.

The sleeve termination molders 17, 18 are used to mold the sleeves M in the upper area, and to seal the mold design. The sleeves M in the upper area can be shaped in such a way that the sleeve extends completely underneath the upper surface of the mold block 1, or partially above this surface. The sleeve termination molders 17, 18 are massive rings designed as a single piece with the sealing plate 2 or secured thereto.

Several sleeve termination molders 17, 18 are attached to a sealing plate 2. Depending on the machine, several replaceable sealing plates 2 with varying sleeve termination molders 17, 18 can be provided. The sealing plate 2 does not move relative to the mold block 1 after the sleeve termination molders 17, 18 have come into contact with the mold block 1.

The return pipes 15, 16 are used to guide the stamps and return the cooling agent. The flow pipes 12, 13 route the cooling agent toward the interior of the stamping heads 3a, 3b, divert it on the inside of the stamping head and discharge it through the return pipes 15, 16. As a result, the cooling medium effectively cools the cooling bodies 3a, 3b of the stamping block 3. The return pipes 15, 16 are securely attached to the mounting device 4, and movably joined with the stamping block 3 via the sliding surface pairs Gl, G2, meaning that the contact surfaces between the stamps 3a, 3b and stamp guide 15, 16 are sliding surfaces.

The sealing plate compression springs 7, 8 are used to ensure that the stamping block 3 can still be moved further relative to the mold block 1 after the sleeve termination molder 17, 18 has come into contact with the mold block 1.

The mounting device 4 (base element) consists of several plates 41, 42, 43, which together execute the motion of a drive (not shown in the figures), e.g., a servomotor. The servomotor here predetermines the path of the mounting device 4, and hence of the stamping blocks 3. There is no relative motion between the drive and the mounting device 4. The mounting device 4 exerts a force on the sealing plate 2 via the sealing plate compression springs 6, 7, 8, moving it until contact has been established between the sleeve termination molders 17, 18 and the mold block 1.

As already mentioned, it is particularly advantageous for the cooling bodies 3a, 3b to be coupled inside a stamping block 3 by means of a coupling fluid. This can be accomplished using a compressible fluid like air or a practically incompressible fluid like water. The corresponding hydraulic feed line or pneumatic feed line preferably contains a valve that is closed when lowering the stamping block 3, so that the above mechanical fluid coupling of the cooing bodies 3a, 3b takes place inside the stamping block 3 or inside the mounting device 4. This prevents such a fluid coupling from taking place far outside the mounting device 4 or far outside the stamping block 3 under conditions that are hard to define (length of fluid feed line, characteristics of fluid source, e.g., compressor or hydraulic pump). Rather, the fluid coupling is installed in a defined area, i.e., in a specific fluid chamber or, if needed, several interacting fluid chambers in the stamping block 3 or in the mounting device 4. As a result, the properties of the fluid coupling are virtually independent of the peripherals (feed lines, ancillary equipment, etc.) of the device according to the invention.

There are several variants for the "floating" of the stamping blocks 3 of the mounting device 4 on the still liquid fluid mass M to be formed in the mold block 1 that arises during the process of cold stamping.

In a first variant, the individual stamping blocks 3, and hence the individual stamps and cooling bodies 3a, 3b, are exposed to compressed air or compressed water. Each stamping block 3 is exposed to compressed air or compressed water form above, so that exposure to the down force exerted from above by the compressed air or compressed water combined with the lift exerted from below by the liquid mass M keep it at equilibrium.

In the case of stamps or cooling bodies 3a, 3b within a cooling body group 3 that are not rigidly connected, but coupled by way of the mentioned fluid coupling, the individual stamps or cooling bodies 3a, 3b in the group are each movably mounted, and exposed from above to compressed air or compressed water through communicating fluid lines, so that each stamp or cooling body 3a, 3b is held at equilibrium by the down force exerted form above by the compressed air or compressed water, and the lift exerted form below by the liquid mass M. Exposure to lift here takes place individually for each stamp 3a, 3b, while exposure to down force for all stamps 3a, 3b in a stamping group 3 takes place in a fluid-coupled manner.

In a second variant, the individual stamping blocks 3, and hence the individual stamps or cooling bodies 3a, 3b are exposed to compressed air or compressed water from above and below. Each stamping block 3 is exposed to compressed air or compressed water from above, so that it is held at equilibrium by the down force exerted from above by the compressed air or compressed water and the lift exerted from below by the liquid mass M and the compressed air or the compressed water.

Given a stamp or cooling body 3a, 3b that is not rigidly connected, but rather joined via the mentioned fluid coupling inside a cooling body group 3, the individual stamps or cooling bodies 3a, 3b in the group are each movably mounted, and are exposed from above and below to compressed air or compressed water through communicating fluid lines, so that each stamp or cooling body 3a, 3b is held at equilibrium by the down force exerted from above by the compressed air or the compressed water, and by the lift exerted from below by the liquid mass M and the compressed air or the compressed water. Exposure to lift here takes place in a fluid-coupled manner for each stamp 3a, 3b (individual percentage by mass M and coupled percentage by compressed air or compressed water). Even exposure to down force for all stamps 3a, 3b of a stamp group 3 occurs in a fluid-coupled manner.

Therefore, the invention enables a wide range of coupling possibilities for the individual cooling bodies or stamps 3a, 3b of each cooling body group or each stamping block 3:
1) Cooling bodies rigidly coupled to each other (massive, single-piece stamping block).
2) Cooling bodies fluid-coupled to each other from above (communicating exposure of movably mounted cooling bodies to fluid in a cooling body group from above, i.e., multi-part "stamping block").
3) Cooling bodies fluid-coupled to each other form above and below (communicating exposure of movably mounted cooling bodies to fluid in a cooling body group from above and below, i.e., multi-part "stamping block").
4) Compressible coupling fluid, e.g., air.
5) Incompressible coupling fluid, e.g., water.

Therefore, the coupling properties of the cooling bodies or stamps can be set between each other within a wide range:
Very rigid coupling to very weak coupling (options 1 to 3)
Very soft or very hard coupling (options 4 and 5)

According to version 4), the cold stamping process can be described as follows, for example:
a) Lowering the entire system (stamping plate with design seal and remaining system) by means of a drive, e.g., a servomotor;
b) Placing the design seals on the mold (the stamps might have already displaced some mass already by this point);
c) Further lowering the remaining system while compressing the springs and submerging into the mass, as well as displacing the mass via the stamps to a predefined distance (control setting);
d) If the hydraulic force of the mass relative to a stamp is greater than the spring resistance of the springs during c), the stamp remains in place despite a further lowering of the remaining system.

As soon as the stamp encounters a slight overpressure, i.e., when the hydraulic compressive force of the mass exceeds the pneumatic pressure on the stamp, it gives way, and the movement of the stamp into the alveolus is stopped. This reduces the pressure space of all stamps, since the stamp stays in its position, while the (remaining) system continues moving downward. Only the stamping plate and the design seals stay motionless due to their contact with the mold. The reduced pressure space, which compresses the air contained in the pressure space, increases the compressive force on the respective stamps, i.e., the suspension is not independent, but coupled.

The invention claimed is:

1. A device for manufacturing feedstuff molded into shells out of a fatty substance, wherein the device comprises:
   a plurality of molds that can be filled with the fatty substance in a liquid, temperature-controlled state, which molds are designed as depressions in a mold block, wherein an interior surface of a respective mold determines an exterior surface of a shell-like feedstuff to be manufactured; and
   a plurality of stamp-like cooling bodies which are movable along a mounting device, wherein a respective one of the cooling bodies can be lowered into a respective one of the molds, and an exterior surface of a respective cooling body determines an interior surface of the shell-like feedstuff to be manufactured, wherein the plurality of cooling bodies mounted on the mounting device form a plurality of cooling body groups, each cooling body group comprises a plurality of individual cooling bodies, the cooling bodies within an individual cooling body group are coupled together and the respective cooling body groups are independently mounted on the mounting device.

2. The device according to claim 1, wherein the cooling body groups are cooling body blocks consisting of adjacent cooling bodies.

3. The device according to claim 1, wherein the cooling bodies within a cooling body group are rigidly interconnected.

4. The device according to claim 3, wherein the cooling body group is a one-piece structure exhibiting several stamp-like cooling bodies.

5. The device according to claim 1, wherein the cooling bodies within a cooling body group are coupled together via a coupling fluid.

6. The device according to claim 5, wherein the coupling fluid is an incompressible fluid.

7. The device according to claim 6, wherein the incompressible fluid is water.

8. The device according to claim 5, wherein the coupling fluid is a compressible fluid.

9. The device according the claim 8, wherein the compressible fluid is air.

10. The device according to claim 5, and further comprising a valve arranged in a fluid feed line that connects a fluid source and the cooling body group.

11. The device according to claim 1, wherein the cooling body groups are groups of two each having two cooling bodies.

12. The device according to claim 1, wherein the cooling body groups are groups of three each having three cooling bodies.

13. The device according to claim 1, wherein the cooling body groups are groups of four each having four cooling bodies.

* * * * *